(12) United States Patent
Bettendorff

(10) Patent No.: US 9,171,133 B2
(45) Date of Patent: Oct. 27, 2015

(54) SECURING A DEVICE AND DATA WITHIN THE DEVICE

(71) Applicant: Landis+Gyr Innovations, Inc., Alpharetta, GA (US)

(72) Inventor: John Bettendorff, San Francisco, CA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 14/051,943

(22) Filed: Oct. 11, 2013

(65) Prior Publication Data
US 2015/0106631 A1    Apr. 16, 2015

(51) Int. Cl.
G06F 11/30    (2006.01)
G06F 21/00    (2013.01)

(52) U.S. Cl.
CPC ........................................ *G06F 21/00* (2013.01)

(58) Field of Classification Search
None
See application file for complete search history.

(56) References Cited

U.S. PATENT DOCUMENTS

| | | | |
|---|---|---|---|
| 6,438,666 B2 * | 8/2002 | Cassagnol et al. | 711/163 |
| 7,681,046 B1 | 3/2010 | Morgan et al. | |
| 2002/0129245 A1 * | 9/2002 | Cassagnol et al. | 713/168 |
| 2003/0140244 A1 * | 7/2003 | Dahan et al. | 713/200 |
| 2008/0082879 A1 | 4/2008 | Guettaf et al. | |
| 2010/0330961 A1 * | 12/2010 | Rogel | 455/411 |
| 2013/0103190 A1 | 4/2013 | Carapelli et al. | |
| 2013/0314249 A1 * | 11/2013 | Le Buhan et al. | 340/870.02 |
| 2014/0089659 A1 * | 3/2014 | Brickell et al. | 713/155 |
| 2014/0173291 A1 * | 6/2014 | Johnson | 713/189 |

FOREIGN PATENT DOCUMENTS

WO    2015084469    6/2015

OTHER PUBLICATIONS

Hong et al., "Design of the Two-way Smart Meter based on industrial ethernet", Power Engineering and Automation Conference (PEAM), 2011 IEEE, Sep. 8, 2011, pp. 537-541, 5 pages.
PCT/US2014/056884, "International Search Report and Written Opinion", Jul. 10, 2015, 11 pages.

* cited by examiner

*Primary Examiner* — Kaveh Abrishamkar
(74) *Attorney, Agent, or Firm* — Kilpatrick Townsend & Stockton LLP

(57) ABSTRACT

Systems and methods are provided for securing a self-securing device and information that is stored in memory within the device. The self-securing device comprising a processor unit and memory external to the processor unit. The processor unit contains a processor and processor unit memory. Upon initialization of the self-securing device, the processor unit determines whether a secure key is stored in the processor unit memory. If no secure key is stored, then the processor unit generates a secure key and stores it in the processor unit memory. The processor unit uses the secure key to decrypt information read from the memory external to the processor unit and to encrypt information to be stored in memory external to the processor unit.

15 Claims, 3 Drawing Sheets

SECURING A DEVICE AND DATA WITHIN THE DEVICE

TECHNICAL FIELD

This disclosure relates generally to securing a device and data stored in memory within the device and more particularly relates to self-securing a device and data stored in memory within the device using a secure key.

BACKGROUND

A metering network may be used to communicate between a resource provider and devices that monitor and control resources, such as electricity, in a home or other location. An example is an electric utility company and the meters located at their customer's houses or businesses. Utility companies and other resource providers may use a metering network to monitor, control, and measure the consumption of resources by consumers. Securing information or data within devices in a metering network is crucial to allow accurate and uninterrupted operation of the metering network.

The flow of communication in a metering network may be from a head-end system through collectors, routers, and other meters to a meter or endpoint at a specified location. Having many network entry points can increase exposure to potential attackers. If left unsecured, entry points are vulnerable to tampering that might allow an attacker to penetrate the network, gain access to control software, and alter load conditions to destabilize the distribution grid. Previous solutions for providing security in a metering network cover the network from the head-end system to the endpoint or meter at a specified location. Devices in a metering network may be vulnerable to tampering since they are geographically dispersed and may not provide security for data stored within the device. In particular, data and code stored in a device is vulnerable if the device is tapped into without authorization. This occurs, for example, when a device is stolen for the purpose of reconfiguring it to make another device (cloning the device) or when a device is stolen for harvesting its parts to be used on other devices (re-purposing a device). Accordingly, systems and methods are desirable for a device to secure data stored internally without impacting the flow of secure communication in the metering network.

SUMMARY

Systems and methods are disclosed for securing a device and securing information that is stored within the device that does not impact the flow of communication in a network to which the device is connected. The device includes a processor unit that includes a processor and processor unit memory, as well as memory external to the processor unit. An exemplary method includes determining whether a secure key is stored in processor unit memory. If a secure key is not stored in processor unit memory, then generating a secure key and storing it in the processor unit memory. The processor unit uses the secure key to encrypt and decrypt information read from or written to memory external to the processor unit.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
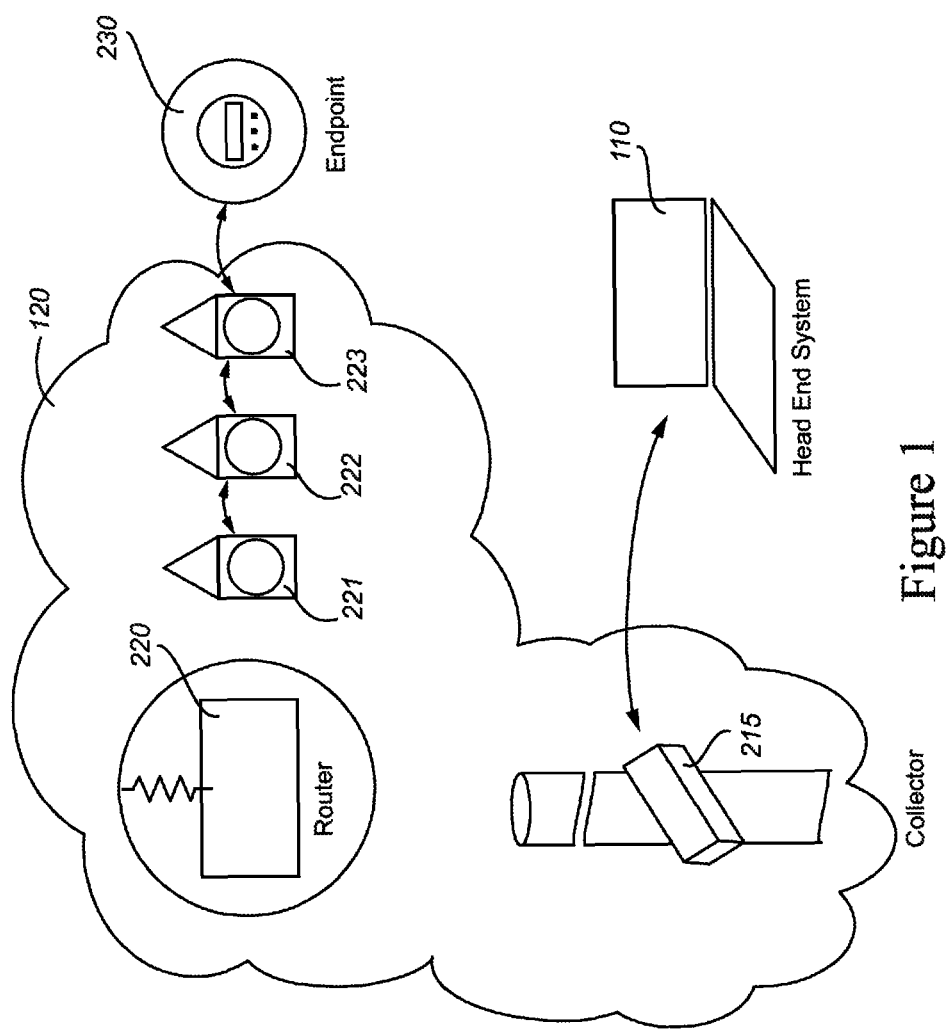
FIG. 1 is a metering network illustrating the network from a head-end system or controller to an endpoint.

Systems and methods are provided for self-securing a device and information that is stored in memory within a device. Though security may be provided for communication between devices in a network, the security of information that is stored in memory of each device in a network may also be provided. Information stored in memory may include but is not limited to executable code and data. The executable code and data and any other information stored in memory will collectively be referred to as information.

The nonvolatile memory of a device, in particular, should be secure as the information stored in nonvolatile memory remains intact when power to the device is shut off. An example of a device in a metering network includes but is not limited to communication devices, measurement devices, and monitoring devices. An example of these devices includes meters, routers, collectors, monitors, controllers of energy management systems such as thermostats, etc. The purpose of all these devices is to monitor and control the consumption of a resource by a consumer. In addition, today's devices in a metering network may have the functionality to receive and respond to commands transmitted over the network. To do this, devices may provide higher levels of functionality. To implement more functionality, the information stored by these devices contains crucial data for the running and management of a metering network. For example, a head-end system enables a user to remotely program meters, collectors, or routers in a metering network to schedule time-of-use periods and rates, handle remote disconnects, analyze critical peak usage, view load control indices, and perform other day-to-day functions such as monitoring. To provide all this functionality, each device in the network may be able to perform secure data transfer. The implementation of secure data transfer requires the use of keys for confidentiality, integrity, verification, and encryption, among others. These keys may be securely stored by each device. In addition, devices in a metering network also contain information regarding the monitoring and managing of the consumption of a resource. Information regarding this functionality may also be kept secure to provide uninterrupted service and monitoring of the resource. This information may include but is not limited to passwords, keys, network addresses, alarms, alerts, device configuration information, hardware identification, etc.

A device in a metering network may contain a self-securing device that includes a processor unit and memory external to the processor unit. The processor unit may contain a processor and processor unit memory. Examples of processor units include, but are not limited to the Texas Instruments Stellaris LM3S1D21 (ARM Cortex M3), Atmel AT91SAM4S (ARM Cortex M4), Renesas M16C, and Toshiba TMPM36BF10FG (ARM Cortex M3) devices.

The processor and the processor unit memory are connected via an internal bus that is contained within the processor unit. The processor unit memory may be implemented using registers or other forms of memory including, but not limited to, random access memory (RAM), flash memory (i.e., memory that is non-volatile), and/or read only memory (ROM). The flash memory of the processor unit memory may contain firmware that may include a boot loader, an operating system, and any application required for the operation of the self-securing device. Upon power up of the self-securing device, the boot loader may load the operating system and any application necessary to initialize and configure the self-securing device for operation. For example, in a meter, an application may provide the functionality of monitoring and measuring the consumption of a resource such as electricity.

The self-securing device also includes memory external to the processor unit. This memory may be non-volatile memory ("NV memory"). Access to this external memory is performed by the processor unit. Hence, if an application running on a device needs data from NV memory, the processor unit accesses the data requested and provides it to the application. If the application requests that data be stored in NV memory, the processor unit receives the data and stores it in NV memory. Information that is crucial to the running of a metering network may be kept in NV memory because it remains intact if the device loses power or is re-booted.

In an example of the present invention, a meter in a metering network includes self-securing devices. A meter includes a communication module and a metrology module. These modules are an integral part of a meter and sometimes housed in the same unit. However, these modules may be separate and linked via a communication path that is external to both modules. If the two modules are on separate circuit boards, the communication path may be a board socket. If the communication module and the metrology module are housed in separate units, the communication path may be a cable.

Since the communication module and the metrology module, even though each an integral part of a meter, are separate, provisions for securing NV memory within each module may be provided. The communication module comprises, in part, a self-securing device that includes a processor unit and NV memory. Likewise, the metrology module comprises, in part, a self-securing device that includes a processor unit and NV memory. Even though the communication module and the metrology module may be part of the same endpoint, each module independently generates its own secure key.

The secure key may be an encryption key such as an AES key which complies with the Advanced Encryption Standard. A random number generator or a pseudo random number generator may be used to generate the key. However, any other method of generating a key and any other encryption standard may be used. To make the key more secure, the key should be generated using a random or pseudo random source, instead of using information that can be readily deduced as being associated with the device, such as the LAN or MAC address of the device or a serial number of a component of the device. These precautions help because if all memory in the processor unit memory is erased, access to NV memory is virtually impossible since the secure key cannot be calculated from numbers such as the LAN address or serial numbers.

The firmware may include functionality to generate a unique secure key. In this scenario, during power-up or initialization of the device, the firmware required to generate a secure key is loaded onto the processor. When executed, the firmware checks to see if the processor unit has a unique secure key. If it does not, it will generate a unique secure key using any key encryption standard and preferably avoiding the use of addresses or serial numbers, as discussed above.

Once generated, the secure key is stored in the processor unit memory. In some implementations the secure key is stored in flash memory, which allows the secure key to survive reboots, power outages, etc. During operation of the device, the secure key may be copied to other parts or portions of the processor unit memory. However, the secure key is only stored in processor unit memory.

Since the secure key is stored in the processor unit memory, to further prevent access to the secure key, any debug or external access to the processor unit should be disabled or removed. For example, the JTAG (Joint Test Action Group) interface of the device may be disabled. The JTAG interface is a port for monitoring and debugging the processor unit. If the JTAG interface is not disabled, an external system may gain access to the internal operations of the processor unit. Disabling the JTAG interface may be accomplished when the device is physically installed or during boot-up of the device. In many devices, a bit or a byte may be changed to disable the JTAG interface.

Once the processor unit has a secure key, any data the processor unit stores in NV memory is encrypted using the secure key. Any data accessed from NV memory may be decrypted using the secure key. In other words, all access to data in NV memory is encrypted or decrypted using the unique secure key for that device. An NV memory read by the processor unit involves reading a block of NV memory and using the secure key to decrypt the data. Verification of the data may be performed using a Cyclic Redundancy Check (CRC) of the unencrypted data. If the check value computed by the CRC checks, the information accessed is valid. If the CRC does not check, the information accessed is not valid. A write to NV memory is the opposite. First, a CRC is computed for the information to be stored in NV memory. Second, the information is encrypted by the processor unit using the secure key. Third, the encrypted data is written to NV memory.

For example, when a communication is received by the communication module of a meter, the application processing the communication is executed by the processor unit and accesses or stores information in NV memory. Any information retrieved by the processor unit from NV memory may be decrypted using the secure key before the information is provided to the executing application. Likewise, any data the executing application requests to store in NV memory is encrypted by the processor unit using the secure key before it is stored in NV memory.

Though the previous example is directed to communication modules and metrology modules in meters, any device that contains a self-securing device that includes a processor unit and NV memory external to the processor unit may implement this self-securing method. The present invention will now be described with reference to the accompanying drawings, in which exemplary embodiments of the invention are shown.

FIG. 1 is an example of a configuration of a metering network. The head-end system 110 controls the metering network by communicating through the network 120. The network 120 that the head-end system may utilize to communicate to an endpoint may include devices such as collectors 215, routers 220, and other endpoints, 221-223. Communication may proceed utilizing any appropriate protocol and any appropriate network configuration. Protocols include, but are not limited to the 802.15.4, PRIME, G3, and TCP/IP protocols. Several endpoints may transmit data to a router 220. The router 220, in turn, may route data to a collector 215 in the network. A collector may receive data from multiple routers. The collector 215 communicates with the head-end system 110. The head-end system may receive and send information to multiple collectors.

The endpoints, such as endpoint 230, may be meters that are usually in geographically dispersed locations such as homes or businesses. The meters are used to monitor a resource such as electricity, water, or natural gas and to measure the usage of the resource. Some meters may be smart meters that support a variety of service commands. These service commands may allow utilities to disconnect, or limit service remotely or manually at the meter. In addition, some meters may store an event log that contains entries of functions the meter has performed. Service commands may originate from the head-end system and are sent via the network to endpoints. Therefore, to support the functionality of a smart meter, crucial data to process service commands is kept in memory and much of this data is kept in NV memory.

To manage a metering network securely, devices on the metering network may allocate memory for data necessary for secure communication. This data includes but is not limited to passwords, keys, LAN addresses, WAN addresses, alarms, alerts, device configuration information, hardware identification, etc. Some of this information is passed from one device to another. Because of this, any data kept on any device in the network should be secure.

Figure 2:
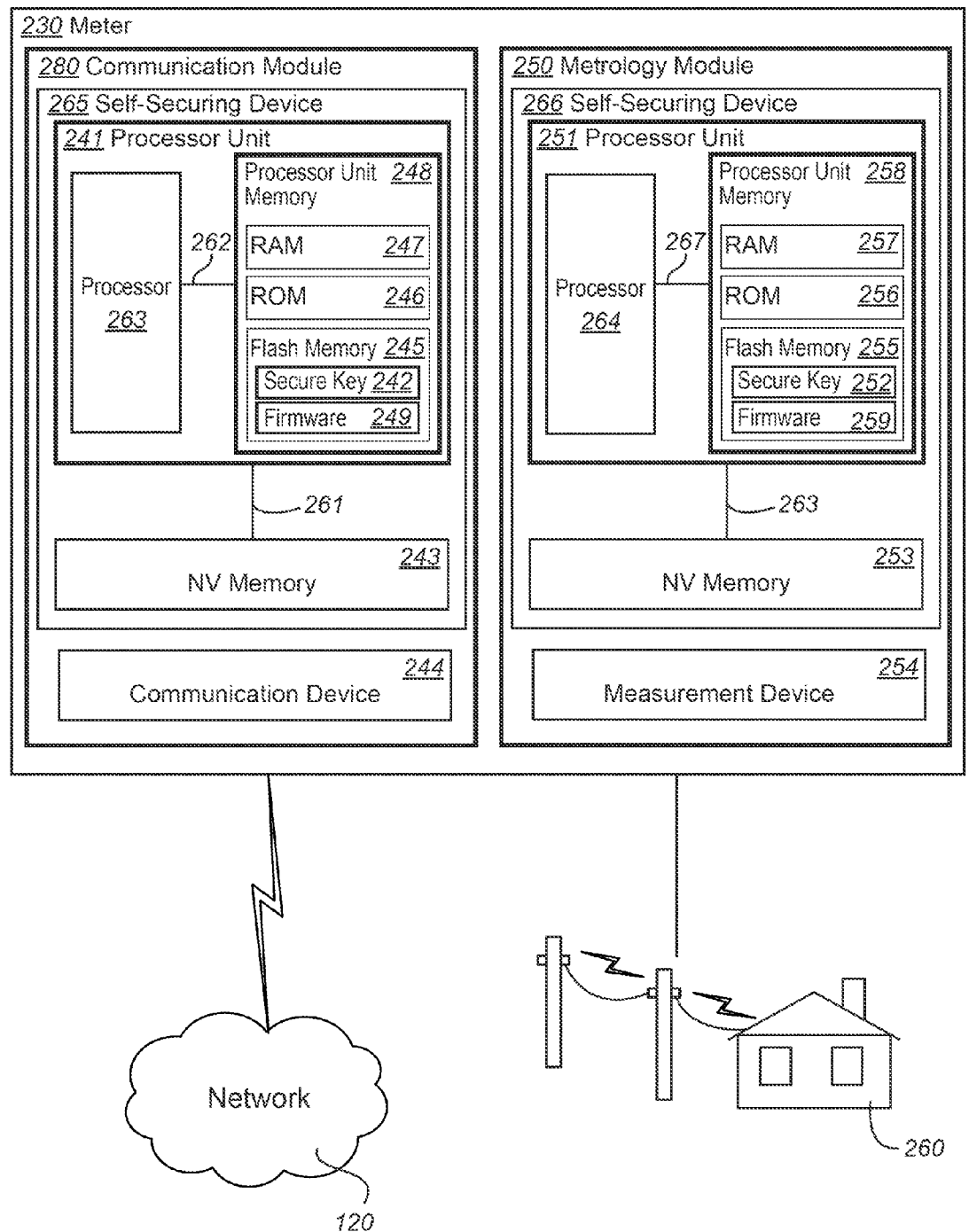
FIG. 2 is a diagram illustrating self-securing devices as part of a meter.

Referring to FIG. 2, a meter 230 comprises a communication module 280 and a metrology module 250. The communication module 280 includes a self-securing device 265 that includes a processor unit 241 and non-volatile random access memory (NV memory) 243 that is separate from the processor unit 241. The processor unit 241 and the NV memory 243 are connected via a bus 261 external to the processor unit 241. The communication module 280 also includes a communication device 244 such as a radio and antenna.

The processor unit 241 contains a processor 263 and memory that is internal memory to the processor unit 241 referred as processor unit memory 248. The processor 263 and the processor unit memory 248 are connected via bus 262 that is contained within the processor unit 241. Processor unit memory 248 may include but is not limited to RAM 247, ROM 246 and flash memory 245. Firmware 249 stored in flash memory 245 may provide the functionality of a boot loader, operating system, and any application that provides device specific functionality. The firmware 249 may also include functionality to generate a secure key. During power-up, boot up, or initialization of the self-securing device, the code necessary in the firmware to generate a secure key is executed by the processor unit 241 to generate a unique secure key 242 that the processor unit 241 may store in its processor unit memory 248, specifically in its internal flash memory 245.

Likewise, the metrology module 250 includes a self-securing device 266 that includes a processor unit 251 and NV memory 253 that is separate from the processor unit 251. The processor unit 251 and NV memory 253 are connected via a bus 263 that is external to the processor unit 251. The metrology module 250 also includes a measurement device 254 for measuring consumption of a resource at a business or home. The processor unit 251 includes a processor 264 and processor unit memory 258 that is internal memory to the processor unit 251. The processor 264 and processor unit memory 258 are connected via an internal bus 267 that is contained within the processor unit 251. The processor unit memory 258 may include but is not limited to RAM 257, ROM 256, and flash memory 255. Like flash memory 245 in the communication module, the flash memory 255 in the metrology module may include firmware 259 that provides the functionality of a boot loader, operating system, and any application that provides device specific functionality. The firmware 259 in the flash memory 255 of the metrology module may also include functionality to generate a secure key 252. The unique secure key 252 for the metrology module may be provided in the same manner as the unique secure key 242 for the communication module. That is, during power-up, boot-up or initialization, the firmware 259 may generate a unique secure key 252 that the processor unit 251 may store in its processor unit memory 258, specifically in its internal flash memory 255. Note, the unique secure key 242 for the communication module 280 and the unique secure key 252 for the metrology module 250 are unique to each device. In addition, these keys 242 and 252 are not communicated between devices. They are kept internal to the respective self-securing device and only used by the respective self-securing device.

When the communication module 280 receives a communication from the network 120, an application in flash memory 245 may be loaded and executed by the processor unit 241 to process this communication. The communication may, for example, be a request from the head-end system 110 to send a meter reading at a particular time. Before the communication is processed, the application performs security checks on the communication to verify confidentiality and integrity of the message. To do this, the application may need access to NV memory 243 to obtain any keys or algorithms to perform the confidentiality or integrity checking. When the application requests from the processor unit 241 any data that is stored in NV memory 243, the processor unit 241 accesses the data stored in NV memory 243 via bus 261 and uses key 242 to decrypt the data before providing it to the application. Likewise, if the application requests data be stored in NV memory 243, processor unit 241 encrypts this data using key 242 before storing it in NV memory 243. Note that cyclic redundancy checks (CRC) may be performed on data after decryption and before encryption to detect and prevent any accidental changes to the data.

Similarly, when a communication is received by the metrology module, it may also perform confidentiality or integrity checking to confirm that the communication originated from the communication module. To do this, an application loaded from flash memory on processor unit 251 is executed. The application may require data stored in NV memory 253. When processor unit 251 accesses the data requested, via bus 263, it will decrypt the data in NV memory 253 using the secure key 252 before providing the information to the application. If the application requests that the processor unit 251 store information in NV memory 253, the processor unit 251 encrypts the information using key 252 before it is stored in NV memory 253. Again, cyclic redundancy checks (CRC) may be performed on data after decryption and before encryption to detect and prevent any accidental changes to the data.

Figure 3:
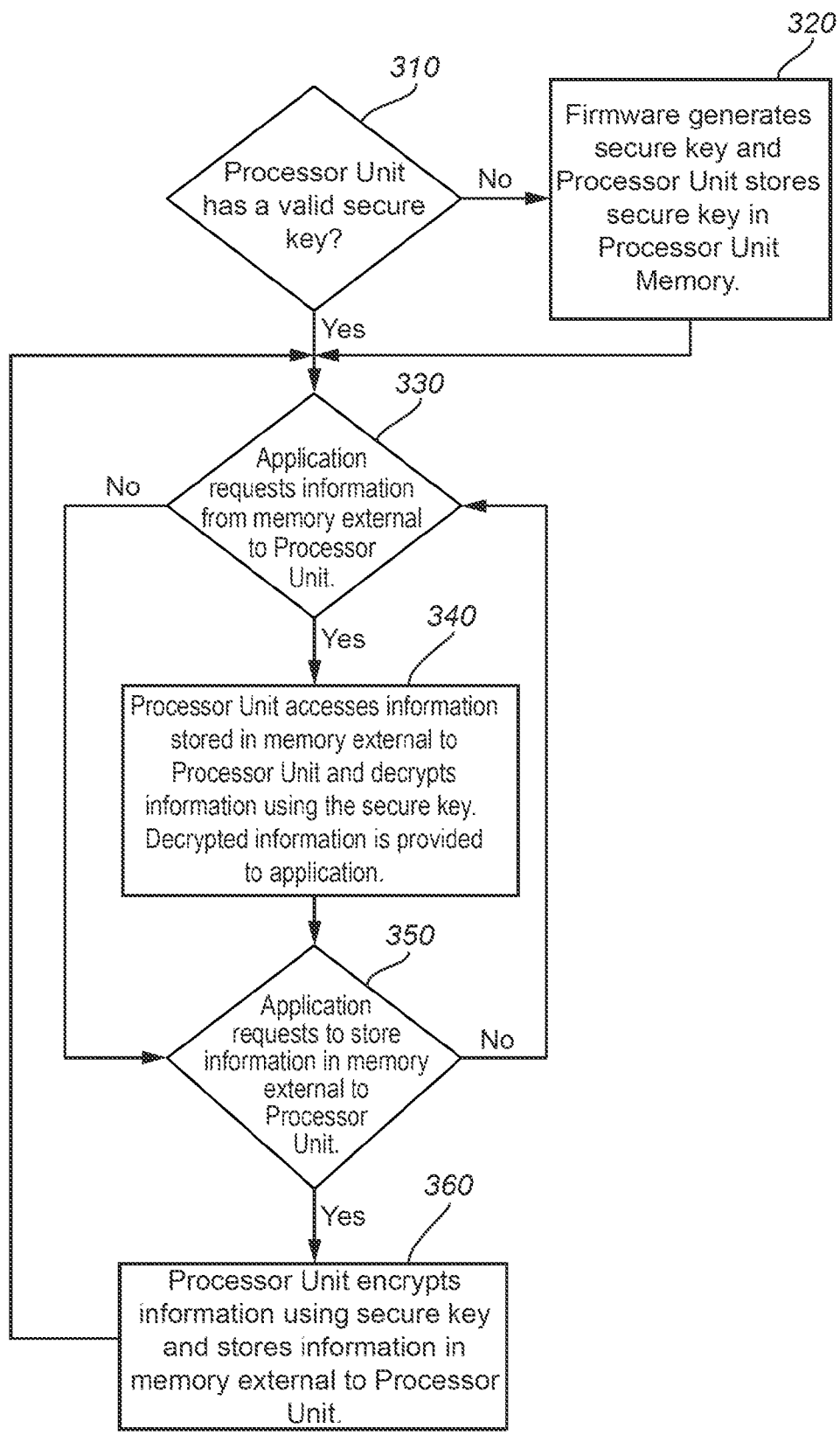
FIG. 3 is a flowchart illustrating the storage and access of memory within a self-securing device using a secure key.

Referring to FIG. 3, securing a device and data within a device commences at 310. Once the device is powered, during boot-up or initialization the firmware loaded by the processor unit may check if a valid secure key exists at 310. If no key or an invalid key, the firmware may generate a secure key that the processor unit may store in its processor unit memory such as flash memory at 320. The unique secure key is only kept by the processor unit in its processor unit memory. Though the secure key may be kept in any type of memory (i.e., flash or RAM) that is part of the processor unit memory, the secure key may be kept in flash memory so that the key remains intact in case of a power outage or any circumstance that causes the device to reboot.

Once the processor unit has a unique secure key, any request to the processor unit for information stored in the device's NV memory at 330, for example by an application executing in the processor unit, is decrypted by the processor unit using the secure key stored in the processor unit memory before it is provided to the application. If the application instead requests that the processor unit store information in NV memory at 350 then the processor unit encrypts the information provided by the application using the unique secure key and stores the encrypted information in NV memory at 360. Accessing memory for information and storing information in memory continues each time with the processor unit decrypting information from NV memory using the secure key at 340 and encrypting any information to be stored in NV memory using the secure key at 360.

General Considerations

These examples given are only for illustrative purposes and not meant to limit the invention to these devices. While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

For example, although a metering implementation has been used for illustration, the invention may be extended to any type of network that includes self-securing devices containing a processor unit and memory. A self-securing device may have different components than those described in the foregoing examples. In addition, although the above examples refer to specific types of memory and specific information in the different types of memory, the invention is not limited to the specifics of the examples. In addition, the above examples refer to an application requesting information from memory and the processor unit encrypting or decrypting information that is accessed from or stored to memory external to the processor unit. These examples are not meant to limit the access or storage of information requested by an application. No matter where a request originates, anytime the processor unit accesses or stores information in memory that is external to the processor unit, the processor unit uses the secure key to decrypt and encrypt this information.

The invention claimed is:

1. A method for self-securing a device, the device comprising a processor unit and memory, wherein the processor unit comprises a processor and processor unit memory connected via an internal bus, comprising:
   upon power up, determining whether a secure key is stored in the processor unit memory;
   when the determination is that the secure key is not stored in the processor unit memory, then:
      generating the secure key using only data available within the device prior to power up, wherein the secure key is generated by the processor unit and is unique to the self-securing device, and
      storing the secure key in the processor unit memory;
   accessing the memory by the processor, wherein information read from the memory is decrypted by the processor using the secure key and information stored in the memory is encrypted by the processor using the secure key; and
   preventing a device external to the processor unit from using an interface of the processor unit to access the internal bus or the processor unit memory.

2. The method of claim 1, wherein preventing a device external to the processor unit from using an interface of the processor unit to access the internal bus or the processor unit memory comprises disabling a JTAG (Joint Test Action Group) interface on the processor unit.

3. The method of claim 1, wherein the secure key is only used within the self-securing device.

4. The method of claim 1, wherein the memory is non-volatile random access memory.

5. The method of claim 1, wherein generating the secure key comprises using a random number generator or a pseudo random number generator to generate the secure key.

6. The method of claim 1, wherein when the determination is that the secure key is stored in the processor unit memory, then using the secure key.

7. A self-securing device comprising:
   a processor unit that includes a processor and processor unit memory, wherein the processor unit memory includes computer-executable instructions for initialization of the self-securing device and the processor and processor unit memory are connected via an internal bus contained within the processor unit; and
   memory external to the processor unit; and
   wherein the processor is operable to execute the computer-executable instructions from the processor unit memory to:
   upon power up, determine whether a secure key is stored in the processor unit memory;
   when the determination is that a secure key is not stored in the processor unit memory, then generating the secure key using only data available within the device prior to power up, wherein the secure key is generated by the processor unit and is unique to the self-securing device, and storing the secure key in the processor unit memory, and
   wherein while executing the computer-executable instructions from the processor unit memory, the processor reads encrypted data from the memory external to the processor unit and decrypts the data using the secure key and encrypts data using the secure key and stores the encrypted data in the memory external to the processor unit.

8. The self-securing device of claim 7, wherein the processor unit further comprises:
   a processor unit debug interface that provides access to the processor unit memory,
   wherein the processor unit debug interface is disabled to prevent access by an external device to the processor unit memory, the processor, or the internal bus through the processor unit interface.

9. The self-securing device of claim 8, wherein the processor unit debug interface is a JTAG interface.

10. The self-securing device of claim 7, wherein the memory external to the processor unit is non-volatile random access memory.

11. The self-securing device of claim 7, wherein the self-securing device is part of a utility meter.

12. A method for self-securing a device, wherein the self-securing device includes a processor unit and memory, wherein the processor unit includes a processor and processor unit memory connected via an internal bus, comprising:
   providing computer-executable instructions in the processor unit memory that when executed by the processor:

generate a secure key using only data available within the device prior to power up within the device, wherein the secure key is generated by the processor unit, and store the secure key in the processor unit memory;

using the secure key to decrypt data read from the memory and using the secure key to encrypt data written to the memory; and preventing a device external to the processor unit from accessing the processor unit, wherein the secure key is only used by the processor unit for accessing the memory.

13. The method of claim 12, wherein preventing a device external to the processor unit from accessing the processor unit comprises disabling a JTAG interface of the processor unit.

14. The method of claim 12, wherein the computer-executable instructions further comprise instructions that when executed by the processor unit:

determine that the secure key is stored in the processor unit memory;

upon determining that the secure key is stored in the processor unit memory, then using the secure key to decrypt data read from the memory and using the secure key to encrypt data written to the memory.

15. The method of claim 12, wherein the memory comprises non-volatile random access memory.

* * * * *